(12) United States Patent
Zhu

(10) Patent No.: US 11,622,330 B2
(45) Date of Patent: Apr. 4, 2023

(54) INDICATION METHOD AND APPARATUS FOR CONTROL SIGNALING, AND TERMINAL, BASE STATION AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 170 days.

(21) Appl. No.: 17/258,154

(22) PCT Filed: Jul. 6, 2018

(86) PCT No.: PCT/CN2018/094901
§ 371 (c)(1),
(2) Date: Jan. 5, 2021

(87) PCT Pub. No.: WO2020/006763
PCT Pub. Date: Jan. 9, 2020

(65) Prior Publication Data
US 2021/0176707 A1 Jun. 10, 2021

(51) Int. Cl.
*H04W 52/02* (2009.01)
*H04W 72/04* (2009.01)
*H04W 72/12* (2009.01)
*H04W 72/044* (2023.01)

(52) U.S. Cl.
CPC ..... *H04W 52/0216* (2013.01); *H04W 72/044* (2013.01); *H04W 72/1289* (2013.01)

(58) Field of Classification Search
CPC ........... H04W 72/044; H04W 72/1289; H04W 52/0216

USPC ......................................................... 370/311
See application file for complete search history.

(56) References Cited

U.S. PATENT DOCUMENTS

| | | | | |
|---|---|---|---|---|
| 10,952,231 B2 * | 3/2021 | Liou | ................... | H04W 72/046 |
| 2017/0041960 A1 | 2/2017 | Quan et al. | | |
| 2018/0049168 A1 | 2/2018 | Ryu et al. | | |
| 2018/0332549 A1 * | 11/2018 | Bhattad | ............... | H04W 56/001 |
| 2019/0059056 A1 * | 2/2019 | Islam | ..................... | H04L 5/001 |
| 2019/0059129 A1 * | 2/2019 | Luo | ..................... | H04W 72/046 |
| 2019/0166556 A1 * | 5/2019 | Ly | ..................... | H04W 52/0216 |
| 2019/0320457 A1 * | 10/2019 | Maaref | ................. | H04L 1/0072 |
| 2019/0342907 A1 * | 11/2019 | Huang | ................... | H04L 5/0048 |
| 2019/0394759 A1 * | 12/2019 | Ying | ..................... | H04W 76/27 |

(Continued)

FOREIGN PATENT DOCUMENTS

| | | |
|---|---|---|
| CN | 102036346 A | 4/2011 |
| CN | 102123432 A | 7/2011 |

(Continued)

OTHER PUBLICATIONS

CN First Office Action in Application No. 201880000863.5, dated Jul. 31, 2020.

(Continued)

*Primary Examiner* — Peter G Solinsky
(74) *Attorney, Agent, or Firm* — Syncoda LLC; Feng Ma

(57) ABSTRACT

An indicating method includes: configuring detection indicating information for indicating a terminal that needs to detect the control signaling within a time window; and sending a message carrying the detection indicating information to the terminal.

14 Claims, 4 Drawing Sheets

Acquiring, by the terminal, detection indicating information sent by a base station for indicating the terminal that needs to detect the control signaling within a time window — S61

Performing control signaling detection within the time window according to the detection indicating information, if the terminal indicated by the detection indicating information includes the current terminal — S62

(56) References Cited

U.S. PATENT DOCUMENTS

| | | | | |
|---|---|---|---|---|
| 2020/0015229 | A1* | 1/2020 | Yang | H04W 72/1289 |
| 2021/0045060 | A1* | 2/2021 | Sui | H04W 72/0406 |
| 2021/0266877 | A1* | 8/2021 | Soriaga | H04W 72/042 |
| 2021/0274521 | A1* | 9/2021 | Yuan | H04W 72/0453 |

FOREIGN PATENT DOCUMENTS

| | | |
|---|---|---|
| CN | 102237956 A | 11/2011 |
| CN | 108781133 A | 11/2018 |
| WO | 2017173303 A1 | 10/2017 |

OTHER PUBLICATIONS

International Search Report in Application No. PCT/CN2018/094901, dated Mar. 18, 2019.
3GPP TSG RAN WG 1 NR Ad Hoc Meeting R1, Title: PDCCH monitoring for slot-aggregation and cross-slot scheduling, R1-1711423, Source: Huawei, HiSilicon; Qingdao, China 27 Jun. 30, 2017.
3GPP TSG RAN WG1 Meeting #89, Title: Discussion on group-common PDCCH, R1-1707825, Source: MediaTek nc.; Hangzhou, P R. China May 15-19, 2017.
3GPP TSG RAN WG1 Meeting #89, Time domain definition for Coreset, R1-1707160, Source: ZTE; Hangzhou, China, May 15-19, 2017.
Chinese Patent Notice of Allowance in Application No. 201880000863.5, dated Sep. 1, 2021.
3GPP TSG RAN WG1 Meeting #91, Reno, USA, Nov. 27-Dec. 1, 2017, Source: Huawei, HiSilicon Title: RMSI delivery, R1-1719372, XP051369281.
3GPP TSG RAN WG1 Meeting #91, Reno, USA, Nov. 27-Dec. 1, 2017, Source: ZTE, Sanechips, Title: Remaining details of RMSI, R1-1719342, XP051369271.
3GPP TSG RAN WG1 Meeting #92bis, Sanya, China, Apr. 16-20, 2018; Source: ZIE, Sanechips, Title: Power consumption reduction for physical channels for MTC, R1-1804189, XP051426477.
Extended European Search Report in Application No. 18925410.5, dated Jan. 31, 2022.

* cited by examiner

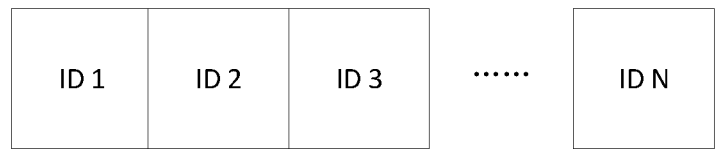

FIG. 4

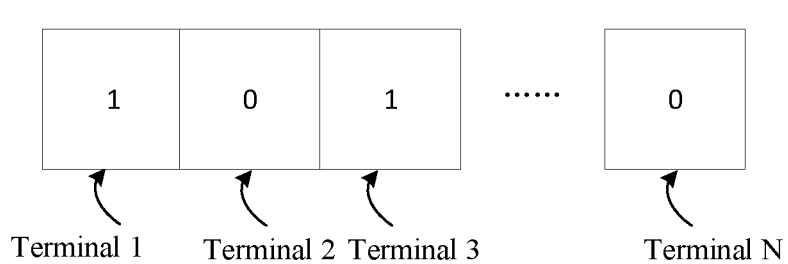

FIG. 5

```
Acquiring, by the terminal, detection indicating information sent by a base station for     S61
indicating the terminal that needs to detect the control signaling within a time
window
                                        ↓
Performing control signaling detection within the time window according to the              S62
detection indicating information, if the terminal indicated by the detection indicating
information includes the current terminal
```

FIG. 6

Indicating device for scheduling signaling

Configuring module — 701

Sending module — 702

FIG. 7

INDICATION METHOD AND APPARATUS FOR CONTROL SIGNALING, AND TERMINAL, BASE STATION AND STORAGE MEDIUM

CROSS-REFERENCE TO RELATED APPLICATION

This application is a national stage of International Application No. PCT/CN2018/094901 filed on Jul. 6, 2018, the disclosure of which is hereby incorporated by reference in its entirety.

TECHNICAL FIELD

The present disclosure relates to the field of communication technology, and in particular, to an indicating method, device, terminal and base station for control signaling, and a storage medium.

BACKGROUND

In the system design of LTE (long term evolution), uplink and downlink transmission of a terminal is performed based on scheduling of a base station. The base station sends downlink or uplink control signaling to indicate the terminal to receive or send data in a notification manner at a corresponding resource location. In addition, for dynamic scheduling, one control signaling is used to indicate transmission on one transmission unit (for example, one subframe). In this way, the terminal needs to detect the control signaling on each transmission unit.

In the related art, in order to reduce overhead for the terminal to detect the control signaling, a sleep state of the terminal is defined. In the sleep state, the terminal does not need to detect the control signaling for each transmission unit, thereby reducing energy consumption.

However, in an active state, the terminal still needs to detect the control signaling for each transmission unit, however the transmission unit may not carry the control signaling for indicating the terminal. Further, even if the terminal is in the sleep state, it needs to periodically monitor PDCCH to determine whether to enter the active state from the sleep state, which still consumes a certain amount of energy.

SUMMARY

In order to overcome the problem in the related art, the present disclosure provides an indicating method, device, terminal and base station for control signaling, and a storage medium.

In order to achieve the above objective, a first aspect of the present disclosure provides an indicating method for control signaling. The method is appliable to a base station, and includes:

configuring detection indicating information for indicating a terminal that needs to detect the control signaling within a time window; and sending a message carrying the detection indicating information to the terminal.

Optionally, the detection indicating information includes an indicating bit corresponding to each terminal, and each indicating bit is configured to indicate whether the terminal corresponding to the indicating bit needs to perform control signaling detection; or the detection indicating information includes an identification of each indicated terminal that needs to perform the control signaling detection.

Optionally, the detection indicating information is further configured to indicate a manner in which the terminal that needs to detect the control signaling within the time window performs control signaling detection.

Optionally, the time window is fixed or configurable.

Optionally, the detection indicating information is carried in a fixed or configurable time-frequency resource location.

Optionally, the detection indicating information is located in a control resource area CORESET for carrying common control information.

Optionally, the detection indicating information has a fixed or configurable aggregation level.

A second aspect of the present disclosure provides an indicating method for control signaling. The method is appliable to a terminal, and includes:

acquiring detection indicating information sent by a base station for indicating the terminal that needs to detect the control signaling within a time window; and performing control signaling detection within the time window according to the detection indicating information, if the terminal indicated by the detection indicating information includes the current terminal.

Optionally, the method includes, prior to performing the control signaling detection within the time window according to the detection indicating information:

determining whether an indicating bit corresponding to the current terminal in the detection indicating information is in a first marking state, and if the indicating bit corresponding to the current terminal is in the first marking state, determining that the current terminal needs to detect the control signaling within the time window; or determining whether the detection indicating information includes an identification of the current terminal, and if the detection indicating information includes the identification of the current terminal, determining that the current terminal needs to detect the control signaling within the time window.

Optionally, the detection indicating information is further configured to indicate a manner in which the terminal that needs to detect the control signaling within the time window performs the control signaling detection, and said performing the control signaling detection within the time window according to the detection indicating information includes:

performing the control signaling detection within the time window according to the manner for detecting indicated by the detection indicating information.

A third aspect of the present disclosure provides an indicating device for control signaling. The device is appliable to a base station and includes:

a configuring module, configured to configure detection indicating information for indicating a terminal that needs to detect the control signaling within a time window; and a sending module, configured to send a message carrying the detection indicating information to the terminal.

Optionally, the detection indicating information includes an indicating bit corresponding to each terminal, and each indicating bit is configured to indicate whether the terminal corresponding to the indicating bit needs to perform control signaling detection; or the detection indicating information includes an identification of each indicated terminal that needs to perform the control signaling detection.

Optionally, the detection indicating information is further configured to indicate a manner in which the terminal that needs to detect the control signaling within the time window performs control signaling detection.

Optionally, the time window is fixed or configurable.

Optionally, the detection indicating information is carried in a fixed or configurable time-frequency resource location.

Optionally, the detection indicating information is located in a control resource area CORESET for carrying common control information.

Optionally, the detection indicating information has a fixed or configurable aggregation level.

A fourth aspect of the present disclosure provides an indicating device for control signaling. The device is applicable to a terminal and includes:

an acquiring module, configured to acquiring detection indicating information sent by a base station for indicating the terminal that needs to detect the control signaling within a time window; and a signaling detection module, configured to perform control signaling detection within the time window according to the detection indicating information, if the terminal indicated by the detection indicating information includes the current terminal.

Optionally, the device further includes:

a first determining module, configured to determine whether an indicating bit corresponding to the current terminal in the detection indicating information is in a first marking state, and if the indicating bit corresponding to the current terminal is in the first marking state, determine that the current terminal needs to detect the control signaling within the time window; or a second determining module, configured to determine whether the detection indicating information includes an identification of the current terminal, and if the detection indicating information includes the identification of the current terminal, determine that the current terminal needs to detect the control signaling within the time window.

Optionally, the detection indicating information is further configured to indicate a manner in which the terminal that needs to detect the control signaling within the time window performs the control signaling detection, and the signaling detection module is configured to:

perform the control signaling detection within the time window according to the manner for detecting indicated by the detection indicating information.

A fifth aspect of the present disclosure provides a computer-readable storage medium having a computer program stored thereon, and when the computer program is executed by a processor, the steps in the method according to the first aspect are implemented.

A sixth aspect of the present disclosure provides a base station. The base station includes:

a memory, having a computer program stored thereon; and a processor, configured to execute the computer program in the memory to implement the steps in the method according to the first aspect.

A seventh aspect of the present disclosure provides a computer-readable storage medium having a computer program stored thereon, and when the computer program is executed by a processor, the steps in the method according to the second aspect are implemented.

An eighth aspect of the present disclosure provides a terminal. The terminal includes:

a memory, having a computer program stored thereon; and a processor, configured to execute the computer program in the memory to implement the steps in the method according to the second aspect.

Through the above technical solution, at least the following technical effect may be achieved.

The base station configures the detection indicating information for indicating the terminal that needs to detect the control signaling within the time window, and sends the same to the terminal. In this way, each terminal may determine, based on the detection indicating information, a timing thereof for detecting the control signaling, which avoids that when a transmission unit does not carry the control signaling, all the terminals still perform the control signaling detection on the transmission unit. This also avoids that when the transmission unit only carries the control signaling for a specific terminal, other terminals also perform the control signaling detection on the transmission unit. Therefore, energy consumed by the terminal is reduced.

Other features and advantages of the present disclosure will be described in detail in the following specific embodiments.

BRIEF DESCRIPTION OF THE DRAWINGS

The drawings herein are incorporated into the specification and constitute a part of the specification, show embodiments that conform to the present disclosure, and together with the specification, serve to explain the principle of the present disclosure.

FIG. 4 is a schematic diagram showing a composition structure of detection indicating information according to an exemplary embodiment;

FIG. 5 is a schematic diagram showing composition structure of another detection indicating information according to an exemplary embodiment;

FIG. 6 is a flow chart showing another indicating method for control signaling according to an exemplary embodiment;

FIG. 7 is a block diagram showing an indicating device for control signaling according to an exemplary embodiment;

DETAILED DESCRIPTION

Exemplary embodiments will be described in detail here, and examples thereof are shown in the accompanying drawings. When the following description is made with reference to the drawings, unless otherwise indicated, the same numbers in different drawings indicate the same or similar elements. The implementations described in the following exemplary embodiments do not represent all implementations consistent with the present disclosure. Rather, they are only examples of devices and methods consistent with some aspects of the present disclosure as detailed in the appended claims.

First, the application scenarios of the embodiments of the present disclosure are described. The following embodiments of the present disclosure may be applied to a wireless communication network, for example, a 5G NR (new radio) system, an LTE system, an LTE-A (long term evolution advanced) system, and a further evolved network.

The wireless communication network includes a base station and a terminal device. The base station may be a device that communicates with a terminal device or other communication sites such as a relay site. The base station may provide a specific physical area with a communication coverage. For example, the base station may specifically be gNB of the 5G NR system, evolutional Node B (ENB or eNodeB) in the LTE system or other access networks that provide access services in the wireless communication network.

In an embodiment of the present disclosure, the terminals may be distributed over the entire wireless communication network, and each terminal may be static or mobile. For example, the terminal may be a cellular phone, a personal digital assistant (PDA), a handheld device, a laptop computer and other wireless communication devices. The terminal may also be an M2M (machine to machine) terminal for M2M communication, for example, may be a device supporting M2M communication such as a smart meter, a smart home appliance and the like. In addition, it shall be illustrated that with the continuous emergence of new Internet applications such as new generation AR (augmented reality) and VR (virtual reality) technologies as well as vehicle-to-vehicle communication, the deployment scenarios of the wireless communication networks are increasing. Therefore, the types of the terminals may become more and more, which are not limited in the present disclosure.

Based on the foregoing application scenarios, an indicating method for control signaling according to an embodiment of the present disclosure will be described below.

Figure 1:
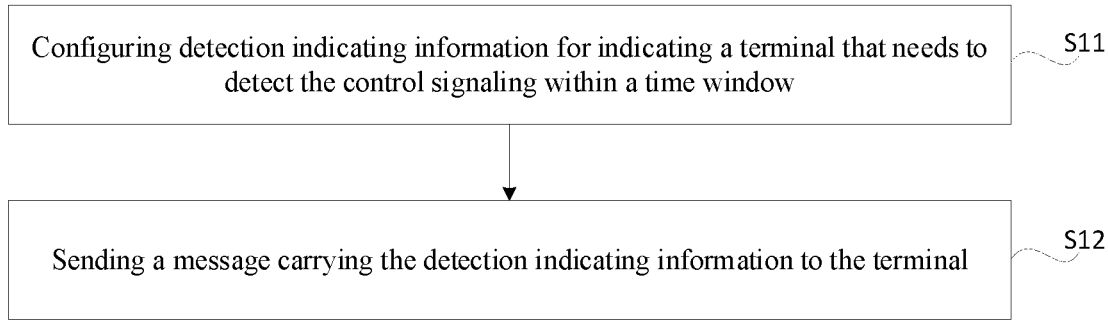
FIG. 1 is a flow chart showing an indicating method for control signaling according to an exemplary embodiment.

FIG. 1 is a flow chart showing an indicating method for control signaling according to an exemplary embodiment. The method is appliable to a base station, and as shown in FIG. 1, the method may include the following steps.

In step S11, detection indicating information for indicating a terminal that needs to detect the control signaling within a time window is configured.

The detection indicating information may be configured by the base station based on service of each terminal. The time window is fixed or configurable, that is, a size of the time window may be predetermined, or may be set according to a specific service every time the detection indicating information is configured. In the time window, all the indicated terminals need to perform control signaling detection. For example, a predetermined transmission unit within a certain time window will carry a control instruction for controlling a first terminal, and the detection indicating information configured by the base station may include indicating information of the time window and indicating information indicating that the first terminal needs to perform control instruction detection. A specific indicating method will be described in detail in subsequent embodiments of the present disclosure.

In addition, it shall be illustrated that the control signaling may be, for example, DCI (downlink control information). The DCI is the downlink control information carried by a downlink physical control channel PDCCH and sent by the base station to the terminal, which may specifically include uplink and downlink resource allocation, HARQ information, power control and the like. In a specific implementation, the control signaling may also be signaling such as RRC signaling, MACCE and the like sent to the terminal by other base stations in the wireless communication network, which is not limited in the present disclosure.

In step S12, a message carrying the detection indicating information is sent to the terminal.

Specifically, the base station may carry the detection indicating information on a transmission unit and transmit the same to the terminal. The transmission unit may be a subframe, a symbol, a radio frame or the like, which is not limited in the present disclosure.

With the above method, the base station configures the detection indicating information for indicating the terminal that needs to detect the control signaling within the time window, and sends the same to the terminal. In this way, each terminal may determine, based on the detection indicating information, a timing thereof for detecting the control signaling, which avoids that when a transmission unit does not carry the control signaling, all the terminals still perform the control signaling detection on the transmission unit. This also avoids that when the transmission unit only carries the control signaling for a specific terminal, other terminals also perform the control signaling detection on the transmission unit. Therefore, energy consumed by the terminal is reduced.

It is further illustrated as for a carrying location of the detection indicating information in the transmission unit, the detection indicating information may be carried in a fixed or configurable time-frequency resource location. Optionally, in a possible implementation of the embodiment of the present disclosure, the detection indicating information may be located in a control resource area CORESET for carrying common control information.

A sending manner of the detection indicating information will be described in detail below by taking that the carrying location of the detection indicating information is the CORESET as an example.

In a first manner, the detection indicating information exists in each CORESET, and each piece of detection indicating information is configured to indicate the terminal that needs to detect the control signaling on the configured CORESET within a time window.

Figure 2:
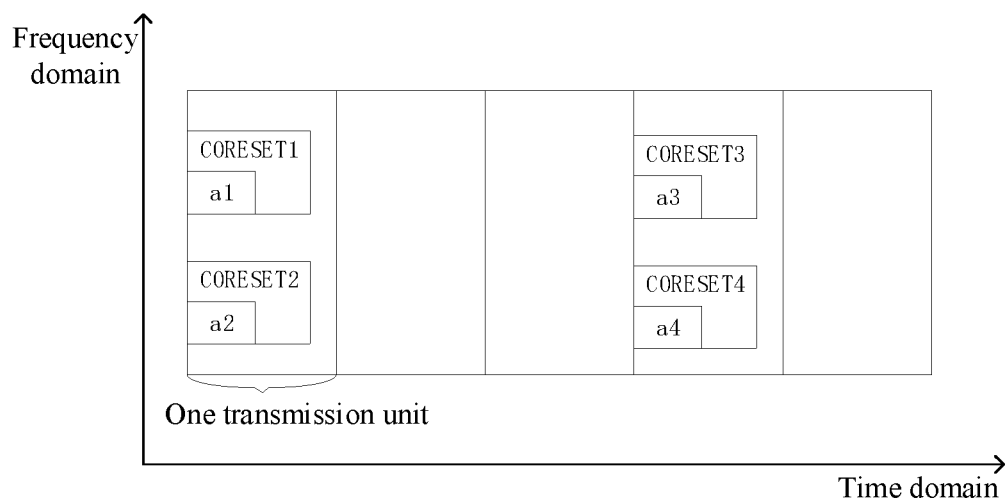
FIG. 2 is a schematic diagram showing detection indicating information carried in CORESET according to an exemplary embodiment.

FIG. 2 is a schematic diagram showing a detection indicating information carried in CORESET according to an exemplary embodiment. As shown in FIGS. 2, a1, a2, a3, and a4 are detection indicating information. As shown in FIG. 2, each CORESET of CORESET1, CORESET2, CORESET3, and CORESET4 carries the detection indicating information. In this way, after any terminal obtains the detection indicating information from the CORESET of a certain transmission unit, if the terminal indicated by the detection indicating information does not include the current terminal, the current terminal may not need to perform the control signaling detection on the CORESET within the time window, thereby reducing energy consumption.

In a second manner, the detection indicating information exits in some predetermined CORESETs. The detection indicating information is configured to indicate a terminal that needs to detect control signaling within a time window.

As for the predetermined CORESET, in a possible implementation, a fixed period may be agreed between the base station and the terminal, so that the base station sends the detection indicating information in the predetermined CORESET in each period. Optionally, the size of the time window may also be indicated in the detection indicating information.

In another possible implementation, the time window may also be determined each time before the base station sends the detection indicating information, and the terminal is notified through the detection indicating information. In the same way, the predetermined CORESET may also be specified by the detection indicating information. That is, a previous detection indicating information includes indicating information for indicating the CORESET carrying a next detection indicating information, so that the terminal may know the next predetermined CORESET that carries the detection indicating information based on each piece of the detection indicating information.

Figure 3:
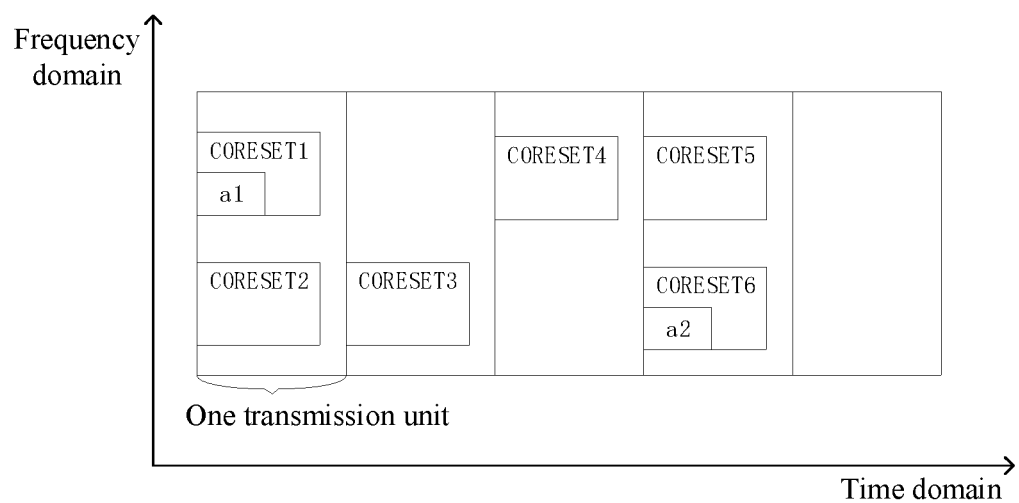
FIG. 3 is a schematic diagram showing another detection indicating information carried in CORESET according to an exemplary embodiment.

Correspondingly, FIG. 3 is a schematic diagram showing another detection indicating information carried in CORESET according to an exemplary embodiment. As shown in FIG. 3, there are a total of six CORESET areas from CORESET1 to CORESET6, CORESET1 carries detection indicating information a1, and CORESET6 carries detection indicating information a2, where the detection indicating information a1 indicates a time window 1 and a terminal that needs to perform control signaling detection in the time window 1. In this way, after the terminal receives the detection indicating information a1, if the terminal indicated by the detection indicating information includes the current terminal, the control signaling detection is performed on each received transmission unit within a time window such as 4 ms. Other unindicated terminals do not need to perform the control signaling detection on any transmission unit within this time window, thereby reducing energy consumption.

It shall be illustrated that in a specific implementation, the base station may use the above two manners at the same time. For a case where a plurality of consecutive transmission units carry the control signaling, the second manner may be used to configure the detection indicating information, and as for a case where separated transmission units carry the control signaling, the first manner may be used to configure the detection indicating information.

It is further illustrated that the structure of the detection indicating information may be as shown in FIG. 4 and FIG. 5. FIG. 4 is a possible implementation of the detection indicating information, including an identification of each indicated terminal that needs to perform the control signaling detection. In other words, the terminals respectively corresponding to ID 1 to ID N shown in FIG. 4 need to perform the control signaling detection within the time window indicated by the detection indicating information. If the terminal receives the detection indicating information, and then determines that the detection indicating information does not include the identification of the current terminal, the terminal does not need to perform the control signaling detection with this time window.

FIG. 5 is another possible implementation of the detection indicating information, including an indicating bit corresponding to each terminal, and each indicating bit is configured to indicate whether the terminal corresponding to the indicating bit needs to perform the control signaling detection, for example, a first indicating bit corresponds to a terminal 1, a second indicating bit corresponds to a terminal 2, a third indicating bit corresponds to a terminal 3, and an Nth indicating bit corresponds to a terminal N. Then if a marking state of the first indicating bit is 1, the terminal 1 needs to perform the control signaling detection, and if a marking state of the second indicating bit is 0, the terminal 2 does not need to perform the control signaling detection.

Optionally, the detection indicating information may have a fixed or configurable aggregation level. That is, the base station, when configuring the detection indicating information, may configure the detection indicating information in the transmission unit according to a predetermined aggregation level. Optionally, the base station may set the aggregation level of the detection indicating information, and configure the detection indicating information in the transmission unit according to the set aggregation level, so as to flexibly control code rate and interference.

Optionally, the detection indicating information is further configured to indicate a manner in which the terminal that needs to detect the control signaling within the time window performs the control signaling detection. For example, the detection manner includes a format of the control signaling that needs to be detected, or the aggregation level of the control signaling that needs to be detected, or the number of times the control signaling is detected, or a combination of the above two or three.

That is, the detection indicating information may further indicate a detection behavior of each indicated terminal that needs to perform the control signaling detection, so that the terminal may quickly and accurately detect and obtain the control signaling.

FIG. 6 is a flowchart showing another indicating method for control signaling according to an exemplary embodiment. The method is appliable to a terminal, and as shown in FIG. 6, the method may include the following steps.

In step S61, the terminal acquires detection indicating information sent by a base station for indicating the terminal that needs to detect the control signaling within a time window.

In step S62, control signaling detection is performed within the time window according to the detection indicating information, if the terminal indicated by the detection indicating information includes the current terminal.

With the above method, after acquiring the detection indicating information sent by the base station, each terminal may determine, based on the detection indicating information, a timing thereof for detecting the control signaling, which avoids that when a transmission unit does not carry the control signaling, all the terminals still perform the control signaling detection on the transmission unit. This also avoids that when the transmission unit only carries the control signaling for a specific terminal, other terminals also perform the control signaling detection on the transmission unit. Therefore, energy consumed by the terminal is reduced.

Specifically, the detection indicating information may be located in a control resource area CORESET for carrying common control information, and the specific location may be pre-agreed by the terminal and the base station, so that the terminal may obtain the corresponding location from the transmission unit.

In addition, in a case of the composition structure of the detection indicating information shown in FIG. 4, the terminal may determine whether the detection indicating information includes an identification of the current terminal, and if the detection indicating information includes the identification of the current terminal, it is determined that the current terminal needs to detect the control signaling within the time window, and if the detection indicating information does not include the identification of the current terminal, the current terminal does not need to detect the control signaling within the time window indicated by the detection indicating information.

In a case of the composition structure of the detection indicating information shown in FIG. 5, the terminal may determine whether an indicating bit corresponding to the current terminal in the detection indicating information is in a first marking state, and if the indicating bit corresponding to the current terminal is in the first marking state, it is determined that the current terminal needs to detect the control signaling within the time window. For example, if the first marking state is 1, and the indicating bit corresponding to the current terminal in the detection indicating information is 1, it indicates that the current terminal needs to detect the control signaling in the time window. If the indicating bit corresponding to the current terminal in the detection indicating information is 0, it indicates that the terminal does not need to detect the control signaling within the time window.

Further, the detection indicating information is further configured to indicate a manner in which the terminal that needs to detect the control signaling within the time window performs the control signaling detection. For example, the detection manner includes a format of the control signaling that needs to be detected, or an aggregation level of the control signaling that needs to be detected, or the number of times the control signaling is detected, or a combination of the above two or three.

That is to say, the indicated terminal that needs to perform the control signaling detection may also perform the control signaling detection within the time window indicated by the detection indicating information according to the manner for detecting further indicated by the detection indicating information, for example, perform the control signaling detection on each transmission unit received within the time window according to the format and the aggregation level of the control signaling to improve detection efficiency.

FIG. 7 is a block diagram showing an indicating device for control signaling according to an exemplary embodiment. The device may be applied to a base station, and as shown in FIG. 7, the device 700 includes:

a configuring module 701, configured to configure detection indicating information for indicating a terminal that needs to detect the control signaling within a time window; and a sending module 702, configured to send a message carrying the detection indicating information to the terminal.

Optionally, the detection indicating information includes an indicating bit corresponding to each terminal, and each indicating bit is configured to indicate whether the terminal corresponding to the indicating bit needs to perform control signaling detection; or the detection indicating information includes an identification of each indicated terminal that needs to perform the control signaling detection.

Optionally, the detection indicating information is further configured to indicate a manner in which the terminal that needs to detect the control signaling within the time window performs control signaling detection.

Optionally, the time window is fixed or configurable.

Optionally, the detection indicating information is carried in a fixed or configurable time-frequency resource location.

Optionally, the detection indicating information is located in a control resource area CORESET for carrying common control information.

Optionally, the detection indicating information has a fixed or configurable aggregation level.

With the above-mentioned device, the base station configures the detection indicating information for indicating the terminal that needs to detect the control signaling within the time window, and sends the same to the terminal. In this way, each terminal may determine, based on the detection indicating information, a timing thereof for detecting the control signaling, which avoids that when a transmission unit does not carry the control signaling, all the terminals still perform the control signaling detection on the transmission unit. This also avoids that when the transmission unit only carries the control signaling for a specific terminal, other terminals also perform the control signaling detection on the transmission unit. Therefore, energy consumed by the terminal is reduced.

The specific manner in which each module of the device in the foregoing embodiment performs an operation has been described in detail in the corresponding method embodiment, which will not be described in detail here.

Figure 8:
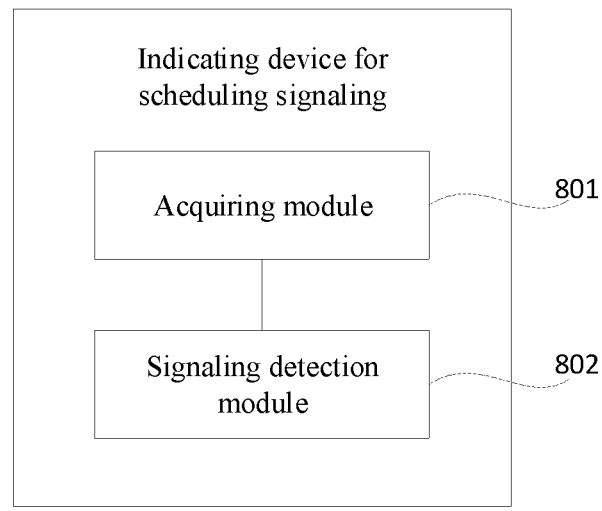
FIG. 8 is a block diagram showing another indicating device for control signaling according to an exemplary embodiment.

FIG. 8 is a block diagram showing an indicating device for control signaling according to an exemplary embodiment. The device may be applied to a terminal, and as shown in FIG. 8, the device 800 includes:

an acquiring module 801, configured to acquiring detection indicating information sent by a base station for indicating the terminal that needs to detect the control signaling within a time window; and a signaling detection module 802, configured to perform control signaling detection within the time window according to the detection indicating information, if the terminal indicated by the detection indicating information includes the current terminal.

Figure 9:
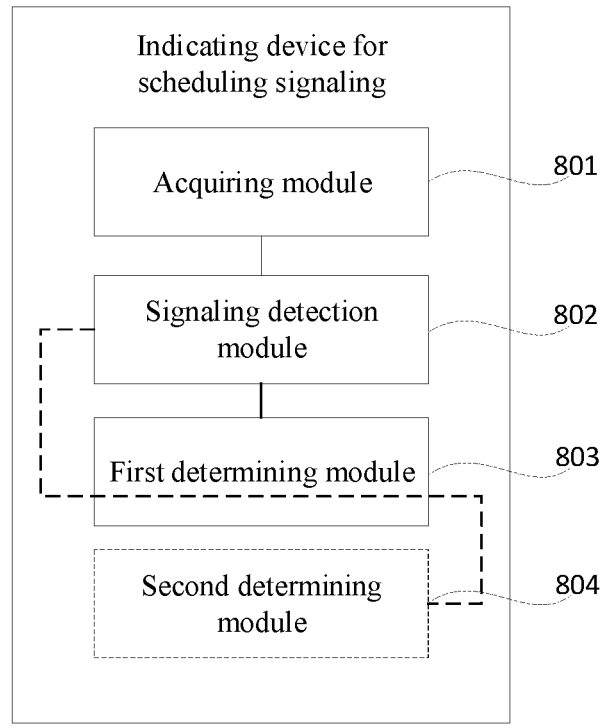
FIG. 9 is a block diagram showing still another indicating device for control signaling according to an exemplary embodiment.

Optionally, as shown in FIG. 9, the device further includes a first determining module 803 as shown in a solid line block or a second determining module 804 as shown in a dashed line block. The first determining module 803 is configured to determine whether an indicating bit corresponding to the current terminal in the detection indicating information is in a first marking state, and if the indicating bit corresponding to the current terminal is in the first marking state, determine that the current terminal needs to detect the control signaling within the time window. The second determining module 804 is configured to determine whether the detection indicating information includes an identification of the current terminal, and if the detection indicating information includes the identification of the current terminal, determine that the current terminal needs to detect the control signaling within the time window.

Optionally, the detection indicating information is further configured to indicate a manner in which the terminal that needs to detect the control signaling within the time window performs the control signaling detection, and the signaling detection module 802 is configured to:

perform the control signaling detection within the time window according to the manner for detecting indicated by the detection indicating information.

With the above-mentioned device, after acquiring the detection indicating information sent by the base station, each terminal may determine, based on the detection indicating information, a timing thereof for detecting the control signaling, which avoids that when a transmission unit does not carry the control signaling, all the terminals still perform the control signaling detection on the transmission unit. This also avoids that when the transmission unit only carries the control signaling for a specific terminal, other terminals also perform the control signaling detection on the transmission unit. Therefore, energy consumed by the terminal is reduced.

The specific manner in which each module of the device in the foregoing embodiment performs an operation has been described in detail in the corresponding method embodiment, which will not be described in detail here.

Figure 10:
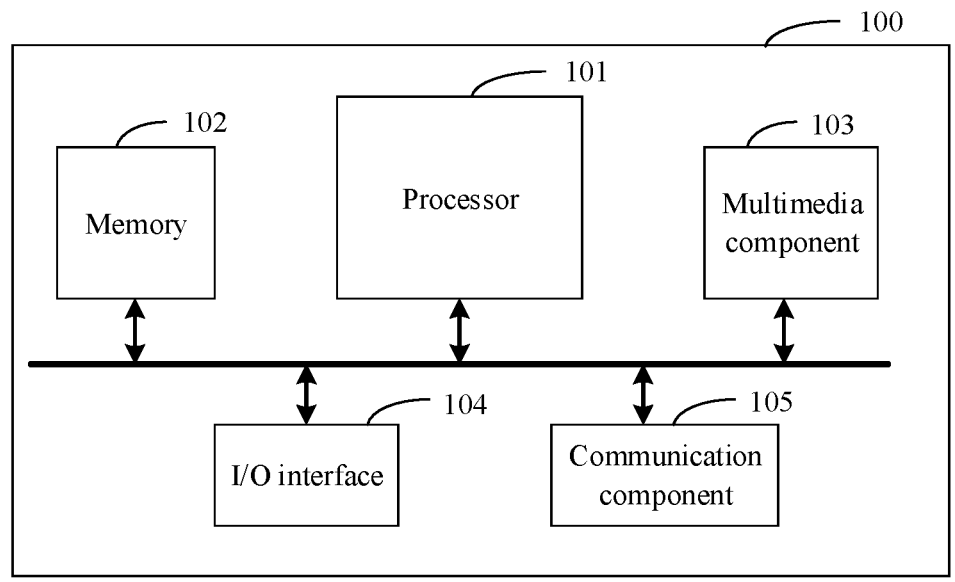
FIG. 10 is a block diagram showing a base station according to an exemplary embodiment.

FIG. 10 is a block diagram showing a base station 100 according to an exemplary embodiment. As shown in FIG. 10, the base station 100 may include a processor 101 and a memory 102. The base station 100 may further include one or more of a multimedia component 103, an input/output (I/O) interface 104, and a communication component 105.

The processor 101 is configured to control the overall operation of the base station 100 to complete all or part of the steps at the base station side in the above-mentioned indicating method for control signaling. The memory 102 is configured to store various types of data to support the operation of the base station 100. These data may include, for example, instructions for any application or method operating on the base station 100, as well as application-related data, such as contact data, messages sent and received, pictures, audio, video and the like. The memory 102 may be implemented by any type of volatile or non-volatile storage device or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk. The multimedia component 103 may include a screen and an audio component. The screen may be for example a touch screen, and the audio component is configured to output and/or input audio signals. For example, the audio component may include a microphone, which is configured to receive external audio signals. The received audio signal may be further stored in the memory 102 or sent through the communication component 105. The audio component also includes at least one speaker for outputting audio signals. The I/O interface 104 provides an interface between the processor 101 and other interface modules. The above-mentioned other interface modules may be keyboards, mice, buttons, and the like. These buttons may be virtual buttons or physical buttons. The communication component 105 is used for wired or wireless communication between the base station 100 and other devices. The wireless communication may be for example Wi-Fi, Bluetooth, Near Field Communication (NFC), 2G, 3G, or 4G, or a combination of the above one or more, so the corresponding communication component 105 may include a Wi-Fi module, a Bluetooth module, an NFC module.

In an exemplary embodiment, the base station 100 may be configured by one or more of application specific integrated circuit (ASIC), digital signal processor (DSP), digital signal processing device (DSPD), programmable logic device (PLD), field programmable gate array (FPGA), controller, microcontroller, microprocessor or other electronic components, so as to execute the method steps at the base station side in the above-mentioned indicating method for control signaling.

In another exemplary embodiment, there is also provided a computer-readable storage medium including program instructions that, when being executed by a processor, implement the method steps at the base station side in the above-mentioned indicating method for control signaling. For example, the computer-readable storage medium may be the foregoing memory 102 including program instructions, which may be executed by the processor 101 of the base station 100 to complete the method steps at the base station side in the foregoing indicating method for control signaling.

Figure 11:
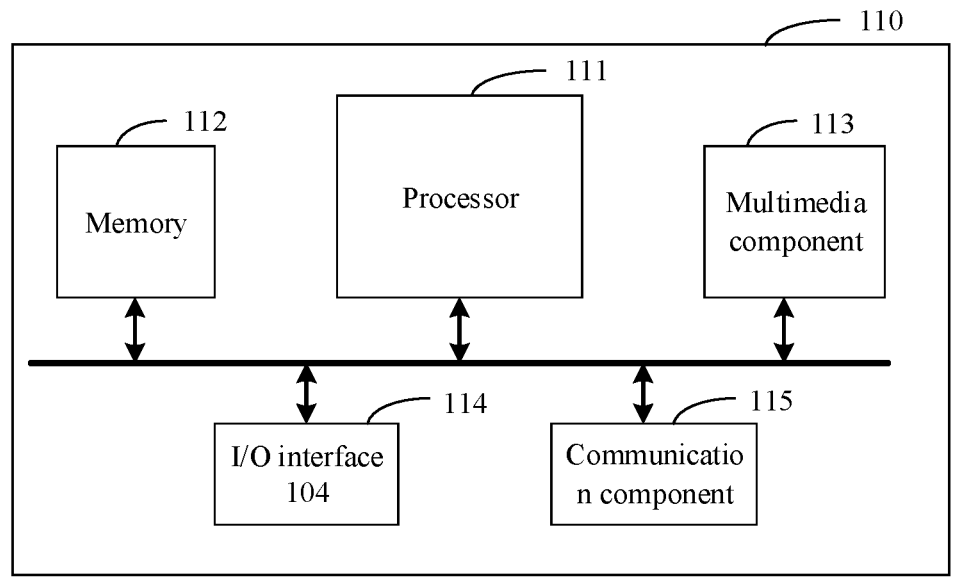
FIG. 11 is a block diagram showing a terminal according to an exemplary embodiment.

FIG. 11 is a block diagram showing a terminal 110 according to an exemplary embodiment. As shown in FIG. 11, the terminal 110 may include a processor 111 and a memory 112. The terminal 110 may also include one or more of a multimedia component 113, an input/output (I/O) interface 114, and a communication component 115.

The processor 111 is configured to control the overall operation of the terminal 110 to complete all or part of the steps at the terminal side in the above-mentioned indicating method for control signaling. The memory 112 is configured to store various types of data to support the operation of the terminal 110. These data may include, for example, instructions for any application or method operating on the terminal 110, as well as application-related data, such as contact data, messages sent and received, pictures, audio, video and the like. The memory 112 may be implemented by any type of volatile or non-volatile storage device or a combination thereof, such as static random-access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk. The multimedia component 113 may include a screen and an audio component. The screen may be for example a touch screen, and the audio component is configured to output and/or input audio signals. For example, the audio component may include a microphone, which is configured to receive external audio signals. The received audio signal may be further stored in the memory 112 or sent through the communication component 115. The audio component also includes at least one speaker for outputting audio signals. The I/O interface 114 provides an interface between the processor 111 and other interface modules. The above-mentioned other interface modules may be keyboards, mice, buttons, and the like. These buttons may be virtual buttons or physical buttons. The communication component 115 is used for wired or wireless communication between the terminal 110 and other devices. The wireless communication may be for example Wi-Fi, Bluetooth, Near Field Communication (NFC), 2G, 3G, 4G or 5G, or a combination of the above one or more, so the corresponding communication component 115 may include a Wi-Fi module, a Bluetooth module, an NFC module.

In an exemplary embodiment, the terminal 110 may be configured by one or more of application specific integrated circuit (ASIC), digital signal processor (DSP), digital signal processing device (DSPD), programmable logic device (PLD), field programmable gate array (FPGA), controller, microcontroller, microprocessor or other electronic components, so as to execute the method steps at the base station side in the above-mentioned indicating method for control signaling.

In another exemplary embodiment, there is also provided a computer-readable storage medium including program instructions that, when being executed by a processor, implement the method steps at the base station side in the above-mentioned indicating method for control signaling. For example, the computer-readable storage medium may be the foregoing memory 112 including program instructions, which may be executed by the processor 111 of the terminal 110 to complete the method steps at the base station side in the foregoing indicating method for control signaling.

The preferred embodiments of the present disclosure are described in detail above with reference to the accompanying drawings. However, the present disclosure is not limited to the specific details in the above-mentioned embodiments. Within the scope of the technical concept of the present disclosure, various simple modifications may be made to the technical solutions of the present disclosure, which all belong to the protection scope of the present disclosure.

In addition, it should be noted that the various specific technical features described in the above-mentioned specific embodiments may be combined in any suitable manner without contradiction, and various possible combinations will not be described in the present disclosure separately in order to avoid unnecessary repetition.

In addition, various different embodiments of the present disclosure may also be combined arbitrarily, which should also be regarded as the content disclosed in the present disclosure, as long as they do not depart from the concept of the present disclosure.

What is claimed is:

1. An indicating method for control signaling, wherein the method is applicable to a base station, and comprises:
    configuring detection indicating information for indicating a terminal that needs to detect the control signaling within a time window; and
    sending a message carrying the detection indicating information to the terminal,
    wherein the detection indicating information comprises an indicating bit corresponding to each terminal, and each indicating bit is configured to indicate whether the terminal corresponding to the indicating bit needs to perform control signaling detection.

2. The method according to claim 1, wherein the detection indicating information is further configured to indicate a manner in which the terminal that needs to detect the control signaling within the time window performs control signaling detection.

3. The method according to claim 1, wherein the time window is fixed or configurable.

4. The method according to claim 1, wherein the detection indicating information is carried in a fixed or configurable time-frequency resource location.

5. The method according to claim 4, wherein the detection indicating information is located in a control resource area CORESET for carrying common control information.

6. The method according to claim 1, wherein the detection indicating information has a fixed or configurable aggregation level.

7. An indicating method for control signaling, wherein the method is applicable to a terminal and comprises:
    acquiring detection indicating information sent by a base station for indicating the terminal that needs to detect the control signaling within a time window; and
    performing control signaling detection within the time window according to the detection indicating information, in response to that the terminal indicated by the detection indicating information comprises the current terminal,
    wherein the method further comprises, prior to the performing the control signaling detection within the time window according to the detection indicating information:
    determining whether an indicating bit corresponding to the current terminal in the detection indicating information is in a first marking state, and in response to that the indicating bit corresponding to the current terminal is in the first marking state, determining that the current terminal needs to detect the control signaling within the time window.

8. The method according to claim 7, wherein the detection indicating information is further configured to indicate a manner in which the terminal that needs to detect the control signaling within the time window performs the control signaling detection, and said performing the control signaling detection within the time window according to the detection indicating information comprises:
    performing the control signaling detection within the time window according to the manner for detecting indicated by the detection indicating information.

9. A non-transitory computer-readable storage medium having a computer program stored thereon for execution by a processor to implement operations of the method according to claim 1.

10. A base station, wherein the base station comprises:
    memory, having a computer program stored thereon; and
    a processor, configured to execute the computer program in the memory to implement operations of the method according to claim 1.

11. A non-transitory computer-readable storage medium having a computer program stored thereon for execution by a processor to implement operations of the method according to claim 7.

12. A terminal, wherein the terminal comprises:
    memory, having a computer program stored thereon; and
    a processor, configured to execute the computer program in the memory to implement:
    acquiring detection indicating information sent by a base station for indicating the terminal that needs to detect the control signaling within a time window; and
    performing control signaling detection within the time window according to the detection indicating information, in response that the terminal indicated by the detection indicating information comprises the current terminal,
    wherein the processor is further configured to implement, prior to the performing the control signaling detection within the time window according to the detection indicating information:
    determining whether an indicating bit corresponding to the current terminal in the detection indicating information is in a first marking state, and in response that the indicating bit corresponding to the current terminal is in the first marking state, determining that the current terminal needs to detect the control signaling within the time window.

13. The terminal according to claim 12, wherein the detection indicating information is further configured to indicate a manner in which the terminal that needs to detect the control signaling within the time window performs the control signaling detection, and said performing the control signaling detection within the time window according to the detection indicating information comprises:
    performing the control signaling detection within the time window according to the manner for detecting indicated by the detection indicating information.

14. The terminal according to claim 12, wherein the terminal is configured to determine, based on the detection indicating information, a timing for detecting the control signaling, to thereby avoid that when a transmission unit does not carry the control signaling, all terminals still perform the control signaling detection on the transmission unit, and avoid that when the transmission unit only carries the control signaling for a specific terminal, other terminals also perform the control signaling detection on the transmission unit, thereby reducing energy consumption of the terminal.

* * * * *